United States Patent
Jia et al.

(10) Patent No.: US 10,810,746 B2
(45) Date of Patent: Oct. 20, 2020

(54) TARGET TRACKING HARDWARE IMPLEMENTATION SYSTEM AND METHOD

(71) Applicant: BEIJING DEEPHI TECHNOLOGY CO., LTD., Beijing (CN)

(72) Inventors: Xijie Jia, Beijing (CN); Di Wu, Beijing (CN); Hanbo Sun, Beijing (CN)

(73) Assignee: XILINX TECHNOLOGY BEIJING LIMITED, Beijing (CN)

( * ) Notice: Subject to any disclaimer, the term of this patent is extended or adjusted under 35 U.S.C. 154(b) by 118 days.

(21) Appl. No.: 15/975,164

(22) Filed: May 9, 2018

(65) Prior Publication Data

US 2019/0139232 A1    May 9, 2019

(30) Foreign Application Priority Data

Nov. 3, 2017   (CN) .......................... 2017 1 1067602

(51) Int. Cl.
*G06T 7/246* (2017.01)
*G06K 9/00* (2006.01)
(Continued)

(52) U.S. Cl.
CPC .......... *G06T 7/248* (2017.01); *G06K 9/00711* (2013.01); *G06K 9/00744* (2013.01);
(Continued)

(58) Field of Classification Search
CPC ....... G06T 2207/00; G06T 2207/20092; G06T 2207/20104; G06T 7/248;
(Continued)

(56) References Cited

U.S. PATENT DOCUMENTS

2008/0100709 A1*  5/2008  Furukawa ............. G01S 3/7865
                                                                348/169
2010/0177193 A1*  7/2010  Flores .................. G08B 13/126
                                                                348/148
(Continued)

FOREIGN PATENT DOCUMENTS

CN          106570893 A          4/2017
CN          106651913 A          5/2017
(Continued)

OTHER PUBLICATIONS

Translation of CN106023248A—Real time video tracking method (Year: 2016).*
C. Wang, et al., Scale Adaptive Kernelized Correlation Filter Tracking Based on HHS-OG Feature, Optics and Precision Engineering, vol. 24, No. 9, p. 2294, Sep. 2019.

*Primary Examiner* — Nizar N Sivji
(74) *Attorney, Agent, or Firm* — IPro, PLLC (57) ABSTRACT

A target tracking hardware implementation system and method are provided. The target tracking hardware implementation system (200) includes: an intercepting and scaling module (210) configured to intercept a target image and to-be-checked images of a plurality of sizes from a video in an external storage module (300), and normalize the images to a specified size by scaling; a feature extracting module (220) configured to extract features of the normalized images; a feature managing module (230) configured to access and update a matching template based on the extracted image features; a Kernelized Correlation Filter (KCF) calculating module (240) configured to calculate the KCF response of each of the to-be-checked images based on the extracted image features and the updated matching template, and select the to-be-checked image with the largest KCF response as the tracked target. The system and method integrate the advantages of the existing KCF algorithm and are implemented on a parallel hardware platform, have the (Continued)

advantages of being small in size, low in power consumption and high in real-timeliness.

20 Claims, 3 Drawing Sheets (51) Int. Cl.
G06K 9/62 (2006.01)
G06K 9/46 (2006.01)
G06K 9/32 (2006.01)

(52) U.S. Cl.
CPC ......... *G06K 9/4671* (2013.01); *G06K 9/6202* (2013.01); *G06K 9/6247* (2013.01); *G06K 9/6256* (2013.01); *G06K 2009/3291* (2013.01); *G06K 2209/21* (2013.01); *G06T 2207/10016* (2013.01); *G06T 2207/20081* (2013.01); *G06T 2207/30232* (2013.01)

(58) Field of Classification Search
CPC . G06T 2207/30232; G06T 2207/20081; G06T 2207/10016; G06K 9/6202; G06K 9/4671; G06K 9/6247; G06K 9/00744; G06K 9/6256; G06K 9/00711; G06K 2209/21; G06K 2009/3291
See application file for complete search history.

(56) References Cited

U.S. PATENT DOCUMENTS

| | | | |
|---|---|---|---|
| 2010/0208031 A1* | 8/2010 | Lee | H04M 1/72572 348/14.02 |
| 2014/0355829 A1* | 12/2014 | Heu | G06K 9/00778 382/103 |
| 2015/0055829 A1 | 2/2015 | Liang | |
| 2015/0160035 A1* | 6/2015 | Longo | H04W 4/029 701/423 |
| 2015/0254811 A1* | 9/2015 | Sahu | G06T 5/50 382/154 |
| 2016/0063727 A1* | 3/2016 | Gao | G06K 9/00335 382/103 |
| 2016/0239972 A1* | 8/2016 | Zhu | G06T 7/0014 |
| 2016/0239982 A1* | 8/2016 | Li | G06K 9/66 |
| 2017/0054449 A1* | 2/2017 | Mani | H03M 7/4075 |
| 2017/0352256 A1* | 12/2017 | Miwa | G08B 25/04 |
| 2018/0012101 A1* | 1/2018 | Mizes | G06K 9/346 |
| 2019/0147602 A1* | 5/2019 | Tao | G06T 7/248 382/103 |

FOREIGN PATENT DOCUMENTS

| | | |
|---|---|---|
| CN | 106887011 A | 6/2017 |
| CN | 107197199 A | 9/2017 |

* cited by examiner

TARGET TRACKING HARDWARE IMPLEMENTATION SYSTEM AND METHOD

TECHNICAL FIELD

The disclosure relates to computer machine vision, and more particularly, to a real-time and high-resolution multi-target tracking method and system.

BACKGROUND

Target tracking is an important topic in the field of computer vision. The main task of the topic is to design a discriminating classifier that can distinguish the target from the environment. Specifically, a Kernelized Correlation Filter (KCF) based high-speed tracker is a new progress in recent years. The KCF algorithm uses a circulant matrix to construct a training sample to train the classifier (a ridge regression problem), and avoids a complicated matrix inversion process by performing calculation in a discrete Fourier domain, thereby reducing the calculation and storage complexity of the algorithm and improving the calculation speed of the algorithm.

The existing KCF algorithm is still implemented in a general-purpose processor using software, such as a CPU, a GPU, or an ARM. However, when serial computing or multithreaded parallel computing is performed on a general-purpose processor, since the degree of parallelism is limited, the algorithm relies heavily on the main frequency, the size and power consumption are high on a high-performance CPU or GPU, the main frequency is too low on an embedded ARM and the performance is seriously insufficient, it is difficult to achieve real-timeliness. In addition, the disadvantages of the serial computing are even more pronounced when a multi-target real-time tracking task is performed.

SUMMARY

One objective of the disclosure is to provide a real-time and high-resolution multi-target tracking method and system so as to achieve real-time tracking of a plurality of targets in a high-resolution video.

According to a first aspect of the disclosure, a target tracking hardware implementation system is provided, comprising: an intercepting and scaling module configured to intercept a target image and to-be-checked images of a plurality of sizes from a video in an external storage module, and normalize the images to a specified size by scaling; a feature extracting module configured to extract features of the normalized images; a feature managing module configured to access and update a matching template based on the extracted image features; and a Kernelized Correlation Filter (KCF) calculating module configured to calculate the KCF response of each of the to-be-checked images based on the extracted image features and the updated matching template, and select the to-be-checked image with the largest KCF response as the tracked target.

Preferably, according to the system of the first aspect of the disclosure, the video may be a high-resolution video.

Preferably, according to the system of the first aspect of the disclosure, the feature extracting module may be further configured to extract a Histogram of Gradient (HOG) feature, and perform normalization, Principal Component Analysis (PCA) dimension reduction, and Hanning window weighting on the extracted feature vector.

Preferably, according to the system of the first aspect of the disclosure, the feature managing module may use a ping-pong buffer structure to access and use the image features.

Preferably, according to the system of the first aspect of the disclosure, the intercepting and scaling module may be further configured to: acquire the previous frame from the video as a training image frame, acquire the current frame as the to-be-checked image frame; extract the target position from the training image frame, and extract the to-be-checked positions of a plurality of sizes based on the target position; intercept the target image from the training image frame and normalize the target image to a specified size by scaling, intercept the to-be-checked image at each of the to-be-checked positions from the to-be-checked image frame and normalize the images to the same size by scaling.

Preferably, the feature extracting module may be further configured to extract the feature vector of the normalized target image and the feature vector of the normalized to-be-checked image and send the feature vectors to the feature managing module for storage. The feature managing module may be further configured to read a history train matching template from the external storage module and use the feature vector of the target image to update a feature train matching template. The KCF calculating module may be further configured to calculate and generate a KCF training coefficient based on the feature vector of the target image read from the feature managing module on the basis of the discrete Fourier transform, thereby updating a KCF training coefficient matching template; use the updated KCF training coefficient matching template to calculate the KCF response of the feature vector of each of the to-be-checked images based on the updated feature train matching template read from the feature managing module and the feature vector of the to-be-checked images read from the feature managing module; and use the to-be-checked image with the largest KCF response as the tracked target to convert the tracked target size and the offset distance.

According to a second aspect of the disclosure, a target tracking method is provided, comprising: intercepting a target image and to-be-checked images of a plurality of sizes from a video in an external storage module and normalizing the images to a specified size by scaling by an intercepting and scaling module; extracting features of the normalized images by a feature extracting module; accessing and updating a matching template based on the extracted image features by a feature managing module; and calculating the KCF response of each of the to-be-checked images based on the extracted image features and the updated matching template, and selecting the to-be-checked image with the largest KCF response as the tracked target by a Kernelized Correlation Filter (KCF) calculating module.

Preferably, according to the method of the second aspect of the disclosure, the video may be a high-resolution video.

Preferably, according to the method of the second aspect of the disclosure, the feature extracting module may be further configured to extract a Histogram of Gradient (HOG) feature, and perform normalization, Principal Component Analysis (PCA) dimension reduction, and Hanning window weighting on the extracted feature vector.

Preferably, according to the method of the second aspect of the disclosure, the feature managing module may use a ping-pong buffer structure to access and use the image features.

Preferably, according to the method of the second aspect of the disclosure, the step of intercepting a target image and to-be-checked images of a plurality of sizes from a video in an external storage module and normalizing the images to a specified size by scaling may further comprise: acquiring the previous frame from the video as a training image frame, acquiring the current frame as the to-be-checked image frame; extracting the target position from the training image frame, and extracting the to-be-checked positions of a plurality of sizes based on the target position; intercepting the target image from the training image frame and normalizing the target image to a specified size by scaling, intercepting the to-be-checked image at each of the to-be-checked positions from the to-be-checked image frame and normalizing the images to the same size by scaling.

Preferably, according to the method of the second aspect of the disclosure, the step of extracting features of the normalized images may further comprise: extracting the feature vector of the normalized target image and the feature vector of the normalized to-be-checked image for storage. The step of accessing and updating a matching template based on the extracted image features may further comprise: reading a history train matching template from the external storage module and using the feature vector of the target image to update a feature train matching template. The step of calculating the KCF response of each of the to-be-checked images based on the extracted image features and the updated matching template and selecting the to-be-checked image with the largest KCF response as the tracked target may further comprise: calculating and generating a KCF training coefficient based on the feature vector of the read target image on the basis of the discrete Fourier transform, thereby updating a KCF training coefficient matching template; using the updated KCF training coefficient matching template to calculate the KCF response of the feature vector of each of the to-be-checked images based on the read updated feature train matching template and the feature vector of the read to-be-checked images; and using the to-be-checked image with the largest KCF response as the tracked target to convert the tracked target size and the offset distance.

Preferably, the method according to the second aspect of the disclosure may further comprise: using a plurality of sets of computing resources to traverse a plurality of targets in parallel until the tracking of all the targets is completed.

Preferably, the method according to the second aspect of the disclosure may further comprise: using the current frame as a training image frame, reading the next frame from the video as the to-be-checked image frame, and performing the control method by sequentially traversing all the image frames in the video until the end of the video.

According to a third aspect of the disclosure, a computer-readable medium is provided, which is configured to record instructions executable by a processor, the instructions, when executed by the processor, cause the processor to perform the target tracking method, comprising the following operations: intercepting a target image and to-be-checked images of a plurality of sizes from a video in an external storage module and normalizing the images to a specified size by scaling; extracting features of the normalized images; accessing and updating a matching template based on the extracted image features; and calculating the Kernelized Correlation Filter (KCF) response of each of the to-be-checked images based on the extracted image features and the updated matching template, and selecting the to-be-checked image with the largest KCF response as the tracked target.

The disclosure integrates the advantages of the existing KCF algorithm and implements a real-time and high-resolution multi-target tracking method and system on a parallel hardware platform, such as a Field Programmable Logic Array (FPGA) and an Application-Specific Integrated Circuit (ASIC), which has the advantages of being small in size, low in power consumption and high in real-timeliness.

DETAILED DESCRIPTION

The present invention will be described below with reference to the accompanying drawings and embodiments.

DESCRIPTION OF THE EMBODIMENTS

The drawings are only for purposes of illustration and are intended to describe and not to limit the invention. The following further describes the technical solution of the present invention with reference to the accompanying drawings and embodiments.

Figure 1:
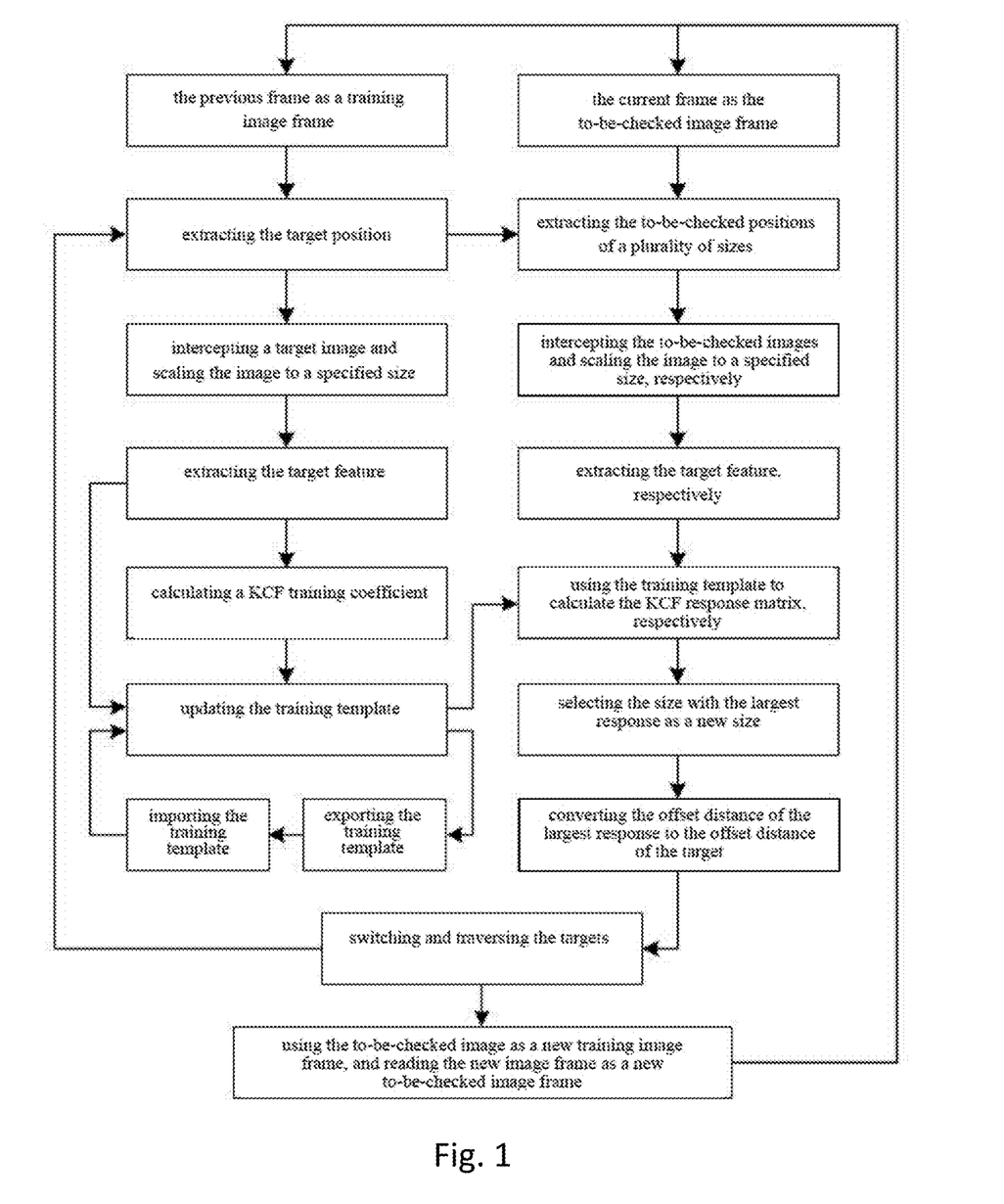
FIG. 1 is a schematic diagram illustrating a target tracking method according to a preferred embodiment of the disclosure.

FIG. 1 is a schematic diagram illustrating a target tracking method according to a preferred embodiment of the disclosure. As shown in FIG. 1, the disclosure provides a real-time and high-resolution multi-target tracking method.

The method according to one preferred embodiment shown in FIG. 1 comprises the following steps.

Step 1: the previous frame is acquired as a training image frame and the current frame is acquired as the to-be-checked image frame through the video. Preferably, the video may be a high-resolution video to provide a better picture quality and more image details.

Step 2: the target position is extracted from the training image frame, and the to-be-checked positions of a plurality of sizes are extracted based on the target position.

Step 3: the target image is intercepted from the training image frame and the target image is normalized to a specified size by scaling, the to-be-checked image at each of the to-be-checked positions is intercepted from the to-be-checked image frame, respectively, and the images are normalized to the same size by scaling.

Step 4: the features of the normalized target image and each of the normalized to-be-checked image are extracted, respectively. Preferably, a Histogram of Gradient (HOG) feature is extracted, and normalization, Principal Component Analysis (PCA) dimension reduction, and Hanning window weighting are performed on the feature vector to reduce the boundary effect of the circulant matrix.

Step 5: the KCF training coefficient of the target image feature is calculated.

Step 6: the history train matching template is imported, the target image feature is used to update a feature train matching template, and the KCF training coefficient of the target image feature is used to update a KCF training coefficient matching template. The updated training template is exported.

Step 7: the KCF response matrix of the feature of the to-be-checked images of various sizes is calculated according to the feature train matching template and the KCF training coefficient matching template of the target image.

Step 8: the size of the to-be-checked image with the largest response is selected as the size of the tracked target from the to-be-checked images of various sizes.

Step 9: the offset distance of the largest response in the feature is converted to the offset distance of the tracked target.

Step 10: this step will switch to another target. Steps 2 through 9 are repeated until all targets are traversed sequentially in series. Preferably, a plurality of sets of computing resources is used to calculate each target in parallel until the calculation of all targets is completed.

Step 11: the current frame is used as a training image frame, the next frame is read from the video stream as the to-be-checked image frame, and steps 2 through 9 are repeated until the end of the video.

Figure 2:
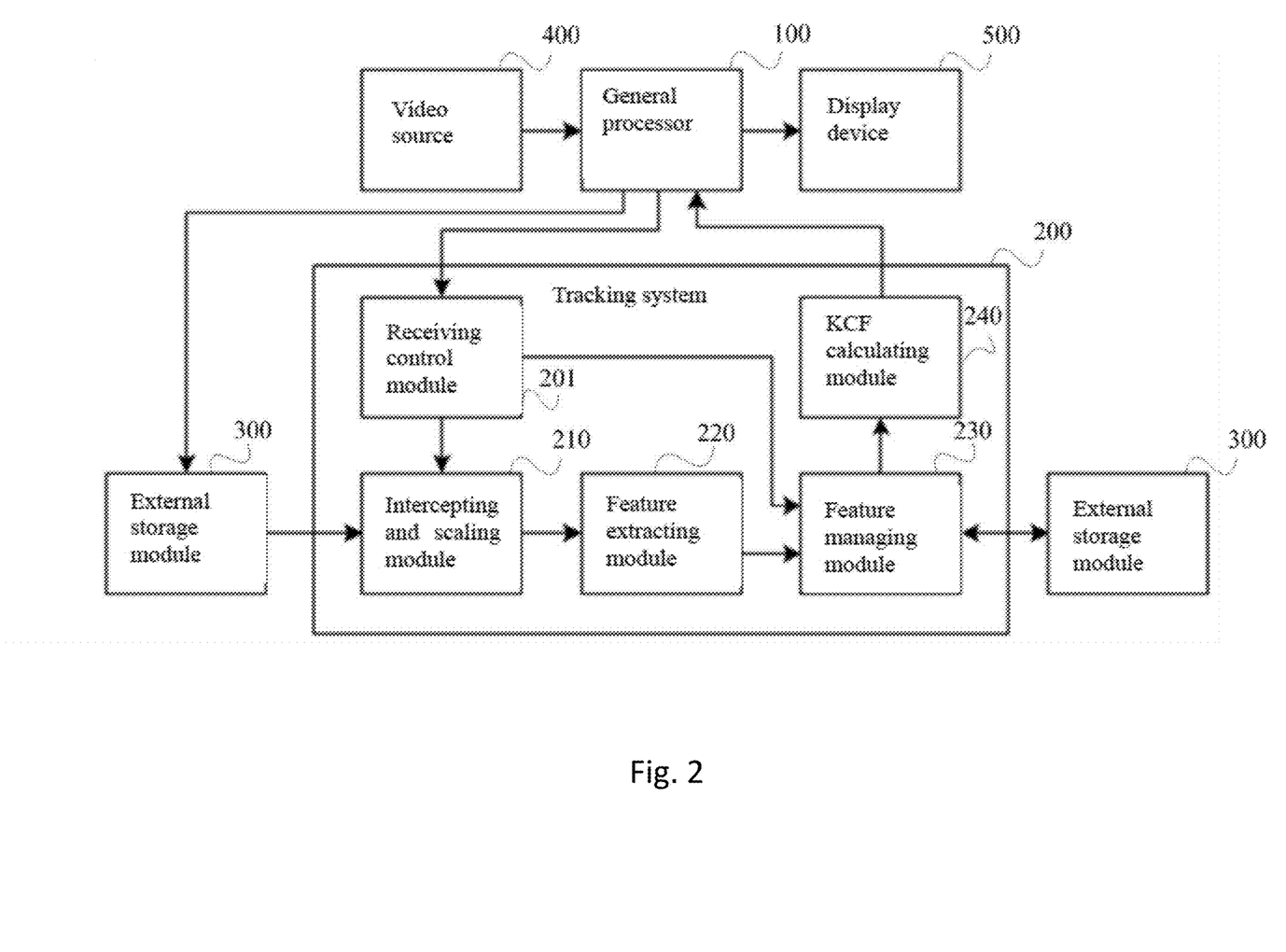
FIG. 2 is a schematic block diagram illustrating a target tracking hardware implementation system according to a preferred embodiment of the disclosure.

The disclosure further provides a real-time and high-resolution multi-target tracking hardware implementation system. FIG. 2 is a schematic block diagram illustrating a target tracking hardware implementation system according to a preferred embodiment of the disclosure. As shown in FIG. 2, the target tracking hardware implementation system 200 according to a preferred embodiment of the disclosure comprises: an intercepting and scaling module 210 configured to intercept a target image and to-be-checked images of a plurality of sizes from a video in an external storage module 300, and normalize the images to a specified size by scaling; a feature extracting module 220 configured to extract features of the normalized images; a feature managing module 230 configured to access and update a matching template based on the extracted image features; a Kernelized Correlation Filter (KCF) calculating module 240 configured to calculate the KCF response of each of the to-be-checked images based on the extracted image features and the updated matching template, and select the to-be-checked image with the largest KCF response as the tracked target.

The target tracking hardware implementation system 200 and its supporting modules or external modules 100, 300, 400, 500, 201 according to a preferred embodiment of the disclosure will be described in detail below in conjunction with the method of FIG. 1 and the block diagram of FIG. 2.

A general processor 100 receives video data from the video source 400 and stores the video data in the external storage module 300, generates a tracking system hardware scheduling strategy, sends instructions and parameters to a receiving control module 201 of the tracking system, receives the calculation result of the KCF calculating module 240, and displays and outputs the arranged calculation result to a display device 500.

A receiving control module 201 is configured to receive the instructions and parameters sent from the general processor 100, and further control the operating modes of the intercepting and scaling module 210 and the feature managing module 230.

The intercepting and scaling module 210 reads the image frame from the external storage module 300 according to the instructions and parameters transmitted by the receiving control module 201, intercepts the image, and normalizes the image to a specified size by scaling.

The feature extracting module 220 is configured to extract features of the normalized images. Preferably, the HOG feature is extracted, and feature normalization, PCA dimension reduction, and Hanning window weighting are performed on the feature vector to improve the classification effect of the KCF classifier and reduce the system calculation and storage complexity.

The feature managing module 230 is configured to manage the feature vector, including storing the feature vector matrix of the calculation result of the feature extracting module 220, storing and updating the feature train matching template, storing and reading the KCF training coefficient matching template, and transmitting the stored feature vector and the feature train matching template to the KCF calculating module 240 in sequence for calculation, and storing the matching template in the external storage module 300 to switch the matching template between a plurality of targets. Preferably, a ping-pong strategy is used to store the feature vector, and the flow of the feature extraction and the KCF calculation is implemented.

The KCF calculating module 240 is configured to calculate the KCF response of the image feature on the basis of the discrete Fourier transform. According to the instruction from the receiving control module 201, in the training step, the target image feature is read from the feature managing module 230, a KCF training coefficient is calculated and generated, and a KCF training coefficient matching template is updated; in the detecting step, the feature train matching template of the target image and the feature vector matrix of the to-be-checked image are read from the feature managing module 230, respectively, the KCF response matrix of the feature of the to-be-checked image is calculated using the KCF training coefficient matching template, the size of the to-be-checked image with the largest response is selected as the size of the tracked target from the to-be-checked images of various sizes, and the offset distance of the largest response in the feature is converted to the offset distance of the tracked target and is transmitted back to the general processor 100.

The external storage module 300 stores a training image frame and the to-be-checked image frame, and preferably uses the ping-pong strategy for storage. The historical train matching template for each of the tracking targets is stored.

Based on the above technical solution, a real-time and high-resolution multi-target tracking method and system provided by the disclosure has the following beneficial effects.

1. The computing system proposed by the disclosure has a flow structure among various modules. When the computing system is implemented in parallel resource-rich hardware devices such as FPGAs, ASICs, etc., the advantages of parallel computing of the devices may be fully utilized to improve the calculation efficiency and satisfy a high-speed real-time calculation requirement. However, a system scheduling is only required on the general processor, effectively reducing the processor load and power consumption and reducing the dependence on the main frequency of the processor.

2. The calculation method proposed by the disclosure can maintain a stable processing speed by the scaling and normalizing of the size when videos of different resolutions are input, providing a good support for high-resolution videos.

3. The calculation method proposed by the disclosure can both use a set of systems to traverse each of the targets in series when performing multi-target tracking, and use the parallelism of device resources to develop a plurality of sets of systems, traverse the target in parallel, and achieve higher-speed and real-time multi-target tracking.

From the above description, a more generalized target tracking method can be summarized.

Figure 3:
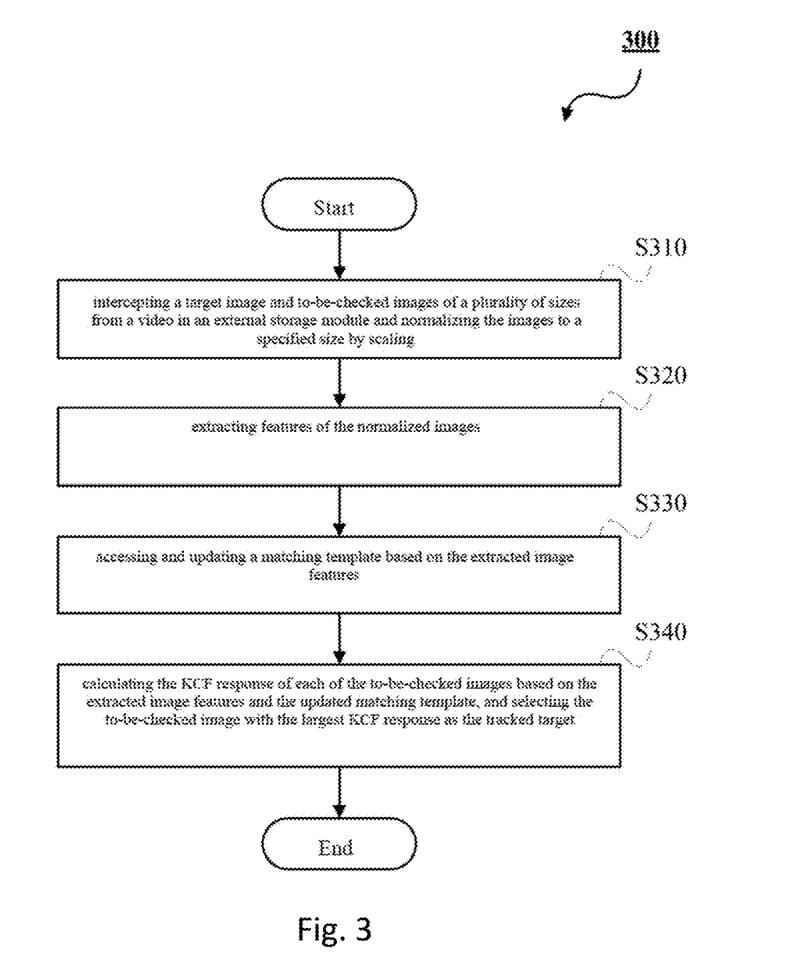
FIG. 3 is a flowchart of a more general target tracking method according to the disclosure.

FIG. 3 is a flowchart of a more general target tracking method according to the disclosure. As shown in FIG. 3, the target tracking method 300 according to the disclosure starts at step S310. In this step, a target image and to-be-checked images of a plurality of sizes are intercepted from the video in the external storage module and the images are normalized to a specified size by scaling. It can be seen from a preferred embodiment that the video shown can be a high-resolution video.

In a preferred embodiment, step S310 is performed by the intercepting and scaling module 210 in FIG. 2. More specifically, step S310 may further comprise: acquiring the previous frame from the video as a training image frame, acquiring the current frame as the to-be-checked image frame; extracting the target position from the training image frame, and extracting the to-be-checked positions of a plurality of sizes based on the target position; intercepting the target image from the training image frame and normalizing the target image to a specified size by scaling, intercepting the to-be-checked image at each of the to-be-checked positions from the to-be-checked image frame, respectively, and normalizing the images to the same size by scaling.

Those of ordinary skill in the art should understand that although the above specific steps are used in the preferred embodiment, the disclosure does not exclude the use of other specific steps to implement the possibility of intercepting and scaling the target image and the to-be-checked images. Therefore, if there are other ways to intercept and scale the target image and the to-be-checked images, such methods and specific steps also belong to the specific details of step S310 and are also within the scope claimed by the disclosure.

Next, at step S320, features of the normalized images are extracted.

In a preferred embodiment, step S320 is performed by the feature extracting module 220 in FIG. 2. More specifically, step S320 may further comprise: extracting the feature vector of the normalized target image and the feature vector of the normalized to-be-checked image for storage. Moreover, the extracted feature may be a Histogram of Gradient (HOG) feature, and normalization, Principal Component Analysis (PCA) dimension reduction, and Hanning window weighting are performed on the extracted feature vector. Those of ordinary skill in the art should understand that although specific means such as a feature vector, a HOG, a PCA, and a Hanning window is used for optimization in the preferred embodiment, other means may also be used for replacement, such as using Singular Value Decomposition (SVD) to replace PCA for the same or similar purpose. Therefore, if there are other ways to extract the features of the normalized target image and the to-be-checked images, such methods and specific steps also belong to the specific details of step S320 and are also within the scope claimed by the disclosure.

At step S330, the matching template is accessed and updated based on the extracted image features.

In a preferred embodiment, step S330 is performed by the feature managing module 230 in FIG. 2. More specifically, step S330 may further comprise reading a history train matching template from the external storage module 300 in FIG. 2 and using the feature vector of the target image to update a feature train matching template.

Then, at step 340, the KCF response of each of the to-be-checked images is calculated based on the extracted image features and the updated matching template and the to-be-checked image with the largest KCF response is selected as the tracked target.

At steps S330 and S340, a ping-pong buffer structure may be used to access and use the image features.

In a preferred embodiment, step S340 is performed by the KCF calculating module 240 in FIG. 2. More specifically, step S340 further comprises: calculating and generating a KCF training coefficient based on the feature vector of the read target image on the basis of the discrete Fourier transform, thereby updating a KCF training coefficient matching template; using the updated KCF training coefficient matching template to calculate the KCF response of the feature vector of each of the to-be-checked images based on the read updated feature train matching template and the feature vector of the read to-be-checked images; and using the to-be-checked image with the largest KCF response as the tracked target to convert the tracked target size and the offset distance.

Similarly, those of ordinary skill in the art should understand that although the above specific methods are used in the preferred embodiment, if there are other ways to calculate the KCF response and thereby select the to-be-checked image with the largest response as the tracked target, such methods and specific steps also belong to the specific details of step S340 and are also within the scope claimed by the disclosure.

When the method 300 is executed using the hardware implementation system 200 of FIG. 2, a plurality of sets of computing resources may be used to traverse a plurality of targets in parallel until the tracking of all the targets is completed.

In addition, at step S310, the previous frame and the current frame may be read as the training image frame and the to-be-checked image frame, respectively. After the current frame has been tracked, the next frame in the video may be entered. That is to say, the current frame is used as the training image frame, and the next frame is read from the video as the to-be-checked image frame, whereby the flowcharts S310 to S340 of the method 300 are executed by sequentially traversing all the image frames in the video until the end of the video. Thus, the method 300 can also end.

Those of ordinary skill in the art will recognize that the method of the disclosure may be implemented as a computer program. As described above in connection with FIG. 3, the method according to the above embodiments may execute one or more programs, comprising instructions to cause a computer or processor to execute the algorithm described in connection with the figures. These programs may be stored and provided to the computer or processor using various types of non-transitory computer-readable media. The non-transitory computer-readable media comprise various types of tangible storage media. Examples of the non-transitory computer-readable media comprise magnetic recording media (such as floppy disks, magnetic tapes, and hard disk drives), magneto-optical recording media (such as magneto-optical disks), CD-ROMs (Compact Disc Read-Only Memory), CD-Rs, CD-R/Ws and semiconductor memories (such as an ROM, an PROM (a programmable ROM), an EPROM (an erasable PROM), a flash ROM, and an RAM (a Random Access Memory)). Further, these programs may be provided to a computer by using various types of transitory computer-readable media. Examples of the transitory computer-readable media comprise electrical signals, optical signals, and electromagnetic waves. The transitory computer-readable media may be used to provide a program to a computer through a wired or wireless communication path such as a wire and an optical fiber.

Therefore, according to the disclosure, a computer program or a computer-readable medium may be further proposed, which is configured to record instructions executable by a processor, which, when executed by the processor, cause the processor to perform a target tracking method, comprising the following operations: intercepting a target image and to-be-checked images of a plurality of sizes from a video in an external storage module and normalizing the images to a specified size by scaling; extracting features of the normalized images; accessing and updating a matching template based on the extracted image features; and calculating the Kernelized Correlation Filter (KCF) response of each of the to-be-checked images based on the extracted image features and the updated matching template, and selecting the to-be-checked image with the largest KCF response as the tracked target.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

Namely, the above embodiments of the present invention are examples for clearly illustrating the invention, but not to limit the mode of implementation of the invention. A person of ordinary skills in the art in relevant fields may make changes of different forms based on the above description. There is no need and no exhaustion of all the ways of implementation. Any modification, replacement or improvement made within the spirit and principles of the invention shall be covered by the protection of the claim of the invention.

What is claimed is:

1. A target tracking hardware implementation system, comprising:
    an intercepting and scaling circuit configured to intercept a target image and to-be-checked images of a plurality of sizes from a video in an external storage module, and normalize the target image and the to-be-checked images to a specified size by scaling;
    a feature extractor configured to extract image features of the normalized images;
    a feature manager configured to read a history train matching template from the external storage module and update a feature train matching template using a feature vector of the normalized target image, wherein the feature manager employs a ping-pong buffer structure to access and use the extracted image features; and
    a Kernelized Correlation Filter (KCF) calculator configured to calculate a KCF response of each of the normalized to-be-checked images based on the extracted image features and the updated feature train matching template, and select a to-be-checked image with a largest KCF response as a tracked target.

2. The system of claim 1, wherein the video is a high-resolution video.

3. The system of claim 1, wherein the feature extractor is further configured to extract a Histogram of Gradient (HOG) feature, and perform normalization, Principal Component Analysis (PCA) dimension reduction, and Hanning window weighting on the extracted HOG feature.

4. The system of claim 1, wherein the intercepting and scaling circuit is further configured to:
    acquire a previous frame from the video as a training image frame, acquire a current frame as a to-be-checked image frame;
    extract a target position from the training image frame, and extract to-be- checked positions of a plurality of sizes based on the target position; and
    intercept the target image from the training image frame and normalize the target image to a specified size by scaling, intercept the to-be-checked images at the to-be-checked positions from the to-be-checked image frame and normalize the to-be-checked images to the same specified size by scaling.

5. The system of claim 1, wherein
the feature extractor is further configured to extract the feature vector of the normalized target image and feature vectors of the normalized to-be-checked images and send the extracted feature vectors to the feature manager for storage;
the KCF calculator is further configured to calculate and generate a KCF training coefficient based on the feature vector of the normalized target image read from the feature manager on a basis of a discrete Fourier transform, thereby updating a KCF training coefficient matching template; use the updated KCF training coefficient matching template to calculate KCF responses of the feature vectors of the normalized to-be-checked images, based on the updated feature train matching template read from the feature manager and the feature vectors of the normalized to-be-checked images read from the feature manager; and use the to-be-checked image with the largest KCF response as the tracked target to convert a tracked target size and an offset distance.

6. A target tracking method, comprising:
    intercepting a target image and to-be-checked images of a plurality of sizes from a video in an external storage module and normalizing the target image and the to-be-checked images to a specified size by scaling by an intercepting and scaling module;
    extracting image features of the normalized images by a feature extracting module;
    reading a history train matching template from the external storage module and updating a feature train matching template using a feature vector of the normalized target image by a feature managing module, wherein the feature managing module employs a ping-pong buffer structure to access and use the extracted image features; and
    calculating a KCF response of each of the normalized to-be-checked images based on the extracted image features and the updated feature train matching template, and selecting a to-be-checked image with a largest KCF response as a tracked target by a Kernelized Correlation Filter (KCF) calculating module.

7. The method of claim 6, wherein the video is a high-resolution video.

8. The method of claim 6, wherein the feature extracting module is further configured to extract a Histogram of Gradient (HOG) feature, and perform normalization, Principal Component Analysis (PCA) dimension reduction, and Hanning window weighting on the extracted HOG feature.

9. The method of claim 6, wherein the step of intercepting further comprises:
    acquiring a previous frame from the video as a training image frame, acquiring a current frame as a to-be-checked image frame;
    extracting a target position from the training image frame, and extracting to-be- checked positions of a plurality of sizes based on the target position; and
    intercepting the target image from the training image frame and normalizing the target image to a specified size by scaling, intercepting the to-be-checked images at the to-be-checked positions from the to-be-checked image frame and normalizing the to-be-checked images to the same specified size by scaling.

10. The method of claim 6, wherein:
the step of extracting features of the normalized images further comprises: extracting the feature vector of the normalized target image and feature vectors of the normalized to-be-checked images for storage;
the step of calculating the KCF response of each of the normalized to-be-checked images based on the extracted image features and the updated feature train matching template and selecting the to-be-checked image with the largest KCF response as the tracked target further comprises: calculating and generating a KCF training coefficient based on the feature vector of the normalized target image on a basis of a discrete Fourier transform, thereby updating a KCF training coefficient matching template; using the updated KCF training coefficient matching template to calculate KCF responses of the feature vectors of the to-be-checked normalized images based on the updated feature train matching template and the feature vector of the normalized to-be-checked images; and using the to-be-checked image with the largest KCF response as the tracked target to convert a tracked target size and an offset distance.

11. The method of claim 6, further comprising: using a plurality of sets of computing resources to traverse a plurality of targets in parallel until the tracking of all the targets is completed.

12. The method of claim 9, further comprising: using the current frame as a training image frame, reading a next frame from the video as the to-be-checked image frame, and performing the control method by sequentially traversing all image frames in the video until an end of the video.

13. A non-transitory computer-readable medium, being configured to record instructions executable by a processor, the instructions, when executed by the processor, cause the processor to perform a target tracking method, the method comprising the following operations:
intercepting a target image and to-be-checked images of a plurality of sizes from a video in an external storage module and normalizing the target image and the to-be-checked images to a specified size by scaling;
extracting image features of the normalized images;
reading a history train matching template from the external storage module and updating a feature train matching template using a feature vector of the normalized target image by a feature managing module that employs a ping-pong buffer structure to access and use the extracted image features; and
calculating a Kernelized Correlation Filter (KCF) response of each of the normalized to-be-checked images based on the extracted image features and the updated feature train matching template, and selecting a to-be-checked image with a largest KCF response as a tracked target.

14. A target tracking hardware implementation system, comprising:
an intercepting and scaling circuit configured to intercept a target image and to-be-checked images of a plurality of sizes from a video in an external storage module, and normalize the target image and the to-be-checked images to a specified size by scaling;
a feature extractor configured to extract image features of the normalized images;
a feature manager configured to read a history train matching template from the external storage module and update a feature train matching template using a feature vector of the extracted target image; and
a Kernelized Correlation Filter (KCF) calculator configured to calculate a KCF response of each of the normalized to-be-checked images based on the extracted image features and the updated feature train matching template, and select a to-be-checked image with a largest KCF response as a tracked target,
wherein the feature extractor is further configured to extract the feature vector of the normalized target image and feature vectors of the normalized to-be-checked images and send the extracted feature vectors to the feature manager for storage; and
wherein the KCF calculator is further configured to calculate and generate a KCF training coefficient based on the feature vector of the extracted target image read from the feature manager on a basis of a discrete Fourier transform, thereby updating a KCF training coefficient matching template; use the updated KCF training coefficient matching template to calculate KCF responses of the feature vectors of the normalized to-be-checked images, based on the updated feature train matching template read from the feature manager and the feature vectors of the normalized to-be-checked images read from the feature manager; and use the normalized to-be-checked image with the largest KCF response as the tracked target to convert a tracked target size and an offset distance.

15. The system of claim 14, wherein the video is a high-resolution video.

16. The system of claim 14, wherein the feature extractor is further configured to extract a Histogram of Gradient (HOG) feature, and perform normalization, Principal Component Analysis (PCA) dimension reduction, and Hanning window weighting on the extracted HOG feature.

17. A target tracking method, comprising:
intercepting a target image and to-be-checked images of a plurality of sizes from a video in an external storage module and normalizing the target image and the to-be-checked images to a specified size by scaling by an intercepting and scaling module;
extracting image features of the normalized images by a feature extracting module including extracting a feature vector of the normalized target image and feature vectors of the normalized to-be-checked images for storage;
reading a history train matching template from the external storage module and updating a feature train matching template using the feature vector of the normalized target image by a feature managing module; and
calculating a KCF response of each of the normalized to-be-checked images based on the extracted image features and the updated feature train matching template, and selecting a to-be-checked image with a largest KCF response as a tracked target by a Kernelized Correlation Filter (KCF) calculating module, including:
calculating and generating a KCF training coefficient based on the feature vector of the normalized target image on a basis of a discrete Fourier transform, thereby updating a KCF training coefficient matching template; using the updated KCF training coefficient matching template to calculate KCF responses of the feature vectors of the normalized to-be-checked images based on the updated feature train matching template and the feature vector of the normalized to-be-checked images; and using the to-be-checked image with the largest KCF response as the tracked target to convert a tracked target size and an offset distance.

18. The method of claim 17, wherein the video is a high-resolution video.

19. The method of claim 17, wherein the feature extracting module is further configured to extract a Histogram of Gradient (HOG) feature, and perform normalization, Principal Component Analysis (PCA) dimension reduction, and Hanning window weighting on the extracted HOG feature.

20. The method of claim 17, wherein the step of intercepting and normalizing further comprises:
  acquiring a previous frame from the video as a training image frame, acquiring a current frame as a to-be-checked image frame;
  extracting a target position from the training image frame, and extracting to-be-checked positions of a plurality of sizes based on the target position; and
  intercepting the target image from the training image frame and normalizing the target image to a specified size by scaling, intercepting the to-be-checked images at the to-be-checked positions from the to-be-checked image frame and normalizing the to-be-checked images to the same size specified by scaling.

* * * * *